US008116004B2

(12) United States Patent
Griffiths

(10) Patent No.: US 8,116,004 B2
(45) Date of Patent: Feb. 14, 2012

(54) REFLECTIVE LIGHT SHELF, SYSTEM AND METHOD

(75) Inventor: Robert T. Griffiths, Elk River, MN (US)

(73) Assignee: Firestone Building Products Company, LLC, Indianapolis, IN (US)

( * ) Notice: Subject to any disclaimer, the term of this patent is extended or adjusted under 35 U.S.C. 154(b) by 98 days.

(21) Appl. No.: 12/750,995

(22) Filed: Mar. 31, 2010

(65) Prior Publication Data

US 2010/0254011 A1 Oct. 7, 2010

Related U.S. Application Data

(60) Provisional application No. 61/165,761, filed on Apr. 1, 2009.

(51) Int. Cl.
*G02B 17/00* (2006.01)

(52) U.S. Cl. ............................ 359/591; 359/597; 52/73

(58) Field of Classification Search .......... 359/591–597; 52/73
See application file for complete search history.

(56) References Cited

U.S. PATENT DOCUMENTS

| | | | | |
|---|---|---|---|---|
| 6,421,966 | B1 * | 7/2002 | Braunstein et al. | 52/74 |
| 7,940,460 | B2 * | 5/2011 | Braunstein et al. | 359/591 |
| 2010/0263298 | A1 * | 10/2010 | Griffiths | 52/73 |

* cited by examiner

*Primary Examiner* — Christopher Mahoney
(74) *Attorney, Agent, or Firm* — Jason A. Houser; Fay Sharpe LLP

(57) ABSTRACT

A reflective light shelf includes a first wall including an outer surface exhibiting a combination of diffuse and spectral reflectivity adapted to reflect light into the associated building structure and an inner surface disposed opposite the outer surface. A second wall includes an inner surface disposed in facing relation to the inner surface of the first wall and an outer surface opposite the inner surface. The second wall is disposed in spaced relation to the first wall such that a shelf height is defined between the outer surfaces of the first and second walls. An inner-core structure is operatively connected between the inner surfaces of the first and second walls. A reflective light shelf system and method are also included.

21 Claims, 7 Drawing Sheets

REFLECTIVE LIGHT SHELF, SYSTEM AND METHOD

This application claims priority from U.S. Provisional Patent Application No. 61/165,761 filed on Apr. 1, 2009, which is hereby incorporated herein by reference in its entirety.

The subject matter of the present disclosure broadly relates to the art of building structures and, more particularly, to a reflective light shelf and system for projecting exterior illumination into an interior space of a building structure. A method of assembling a reflective light shelf system is also provided.

BACKGROUND

Reflective light shelves are known to be installed within building structures and are typically secured on or along the interior of windows of a building structure to reflect and/or redirect exterior illumination into an interior space of the building structure. One benefit of installing reflective light shelves is that the exterior illumination entering the building structure through the windows can be reflected a greater distance into the interior space and/or in a different direction than might otherwise occur.

Notwithstanding the overall usage and benefits of known reflective light shelves, in some cases known constructions have been found to be difficult and/or time consuming to install. This can undesirably lead to increased costs associated with the use of reflective light shelves. In other cases, known reflective light shelves have been designed that are more easily and/or more quickly installed. Unfortunately, these reflective light shelves, once installed, have, in some cases, been found to be less attractive or otherwise less aesthetically pleasing than may be desired. For example, reflective light shelves that are faster or easier to install can include mounting brackets and/or fasteners that remain exposed and visible to an observer within the building structure.

Accordingly, it is believed desirable to develop a reflective light shelf structure, system and method that overcome the foregoing or other disadvantages of known reflective light shelf designs.

BRIEF DESCRIPTION

One example of a reflective light shelf in accordance with the subject matter of the present disclosure that is adapted for use within an associated building structure adjacent an associated window thereof is provided that includes a first wall and a second wall disposed in spaced relation to the first wall such that a chamber is at least partially defined there between. An inner-core structure is disposed within the chamber between the first and second walls.

Another example of a reflective light shelf in accordance with the subject matter of the present disclosure that is adapted for use within an associated building structure adjacent an associated window thereof is provided that includes a first wall and a second wall. The first wall extends longitudinally between opposing first and second ends and laterally between opposing first and second edges, which extend longitudinally along the first wall. The first wall includes an outer surface that is adapted to reflect light into the associated building structure from the associated window. The first wall also includes an inner surface that is disposed opposite the outer surface as well as a first side wall that is disposed along the first edge and a second side wall that is disposed along the second edge. The first and second side walls project in a direction generally away from the outer surface and toward the inner surface. The second wall also extends longitudinally between opposing first and second ends and laterally between opposing first and second edges, which extend longitudinally therealong. The second wall includes an inner surface, an outer surface disposed opposite the inner surface, a first side wall disposed along the first edge and a second side wall disposed along the second edge. The first and second side walls project in a direction generally away from the outer surface and toward the inner surface. The second wall is positioned in spaced relation to the first wall such that the inner surfaces of the first and second walls are facing one another and a chamber is at least partially formed therebetween. An inner-core structure is disposed within the chamber between the inner surfaces of the first and second walls. A first cavity is formed between the first and second walls along the first ends thereof and extends laterally into the reflective light shelf from along the first edges of the first and second walls. A second cavity is formed between the first and second walls along the second ends thereof and extends laterally into the reflective light shelf from along the first edges of the first and second walls. A first support element is at least partially received within the first cavity and includes a first wall portion extending between the first and second walls, a second wall portion projecting longitudinally from the first wall portion along the first wall and a third wall portion projecting longitudinally from the first wall portion along the second wall. A second support element is at least partially received within the second cavity and includes a first wall portion extending between the first and second walls, a second wall portion projecting longitudinally from the first wall portion along the first wall and a third wall portion projecting longitudinally from the first wall portion along the second wall.

A further example of a reflective light shelf in accordance with the subject matter of the present disclosure that is adapted for use within an associated building structure adjacent an associated window thereof can include a first wall extending longitudinally between opposing first and second ends that at least partially define a shelf length and extending laterally between opposing first and second edges that at least partially define a shelf width. The first wall can include an inner surface and an outer surface that disposed opposite the inner surface with the outer surface exhibiting a combination of diffuse and spectral reflectivity operative to reflect light received through the associated window into the associated building structure. A second wall can extend longitudinally between opposing first and second ends that at least partially define the shelf length and extending laterally between opposing first and second edges that at least partially define the shelf width. The second wall can include an inner surface and an outer surface that is disposed opposite the inner surface. The second wall can be oriented with respect to the first wall such that the inner surfaces of the first and second walls are facing one another with the first ends disposed adjacent one another forming a first shelf end and the second ends disposed adjacent one another forming a second shelf end. The first and second walls can be positioned in spaced relation to one another such that a shelf height is at least partially defined therebetween and such that a shelf chamber is at least partially formed between the inner surfaces of the first and second walls. A first support element can be received within the shelf chamber and can include a first wall portion extending in a heightwise direction between the first and second walls. The first support element can be oriented in a widthwise direction relative to the first and second walls. The first support element can be disposed along the first shelf end such that a first cavity is formed between the first and second walls along the first shelf end outwardly of the first support element in a lengthwise direction. A second support element can be received within the shelf chamber and can include a first wall portion extending in a heightwise direction between the first and second walls. The second support element can be oriented in a widthwise direction relative to the first and second walls. The second support element can be disposed along the second shelf end such that a second cavity is formed between the first and second walls along the second shelf end outwardly of the second support element in a lengthwise direction. An inner-core structure can be disposed within the shelf chamber between the inner surfaces of the first and second walls. The inner-core structure can terminate adjacent at least a portion of the first and second support elements such that the first and second cavities remain at least partially void of the inner-core structure.

A reflective light shelf system in accordance with the subject matter of the present disclosure that is adapted to be supported adjacent an associated window of an associated building structure is provided that includes a reflective light shelf and at least one mounting bracket. The reflective light shelf includes a first wall and second wall spaced from the first wall such that a chamber is at least partially defined therebetween. An inner-core structure is disposed between the first and second walls within at least a portion of the chamber. The at least one mounting bracket is adapted for securement on the associated building structure and receivable within the chamber of the reflective light shelf such that the at least one mounting bracket is visually concealed when said reflective light shelf system is installed on the associated window.

A reflective light shelf system in accordance with the subject matter of the present disclosure that is adapted to be supported adjacent an associated window of an associated building structure is provided that includes a reflective light shelf, a first mounting bracket and a second mounting bracket. The reflective light shelf extends lengthwise between opposing first and second ends and extends widthwise between opposing first and second edges. The reflective light shelf includes a first wall and a second wall. The first wall includes an outer surface adapted to reflect light into the associated building structure and an inner surface disposed opposite the outer surface. The second wall includes an inner surface disposed in facing relation to the inner surface of the first wall and an outer surface opposite the inner surface. The second wall is disposed in spaced relation to the first wall such that a shelf height is defined between the outer surfaces of the first and second walls. An inner-core structure is operatively connected between the inner surfaces of the first and second walls. A first cavity is formed along the first end and extends widthwise into the reflective light shelf from along the first edge. A second cavity is formed along the second end and extends widthwise into the reflective light shelf from along the first edge. The first mounting bracket includes a first portion adapted for securement along the associated window and a second portion extending from the first portion in approximately transverse relation thereto. The second mounting bracket includes a first portion adapted for securement along the associated window and a second portion extending from the first portion in approximately transverse relation thereto. The first and second mounting brackets are adapted to be respectively received within the first and second cavities of the reflective light shelf such that the first and second mounting brackets are visually concealed when said reflective light shelf system is installed on the associated window.

One example of a method of installing a reflective light shelf system in accordance with the subject matter of the present disclosure can include providing a reflective light shelf extending lengthwise between opposing first and second ends and extending widthwise between opposing first and second edges. The reflective light shelf can include a first wall including an outer surface exhibiting a combination of diffuse and spectral reflectivity adapted to reflect light into the associated building structure and an inner surface disposed opposite the outer surface. A second wall including an inner surface disposed in facing relation to the inner surface of the first wall and an outer surface opposite the inner surface. The second wall can be disposed in spaced relation to the first wall such that a shelf height is defined between the outer surfaces of the first and second walls. An inner-core structure can be operatively connected between the inner surfaces of the first and second walls. A first cavity can be formed along the first end and can extend widthwise into the reflective light shelf from along the first edge. A second cavity can also be formed along the second end and can extend widthwise into the reflective light shelf from along the first edge. The method can also include providing first and second mounting brackets that each include a first portion adapted for securement along an associated window of an associated building structure and a second portion extending from the first portion in approximately transverse relation thereto. The method can further include securing the first and second mounting brackets on the associated building structure along the associated window thereof. The method can also include supporting the reflective light shelf on the first and second mounting brackets such that the first and second mounting brackets are received within respective ones of the first and second cavities and visibly concealed thereby.

DETAILED DESCRIPTION

Figure 1:
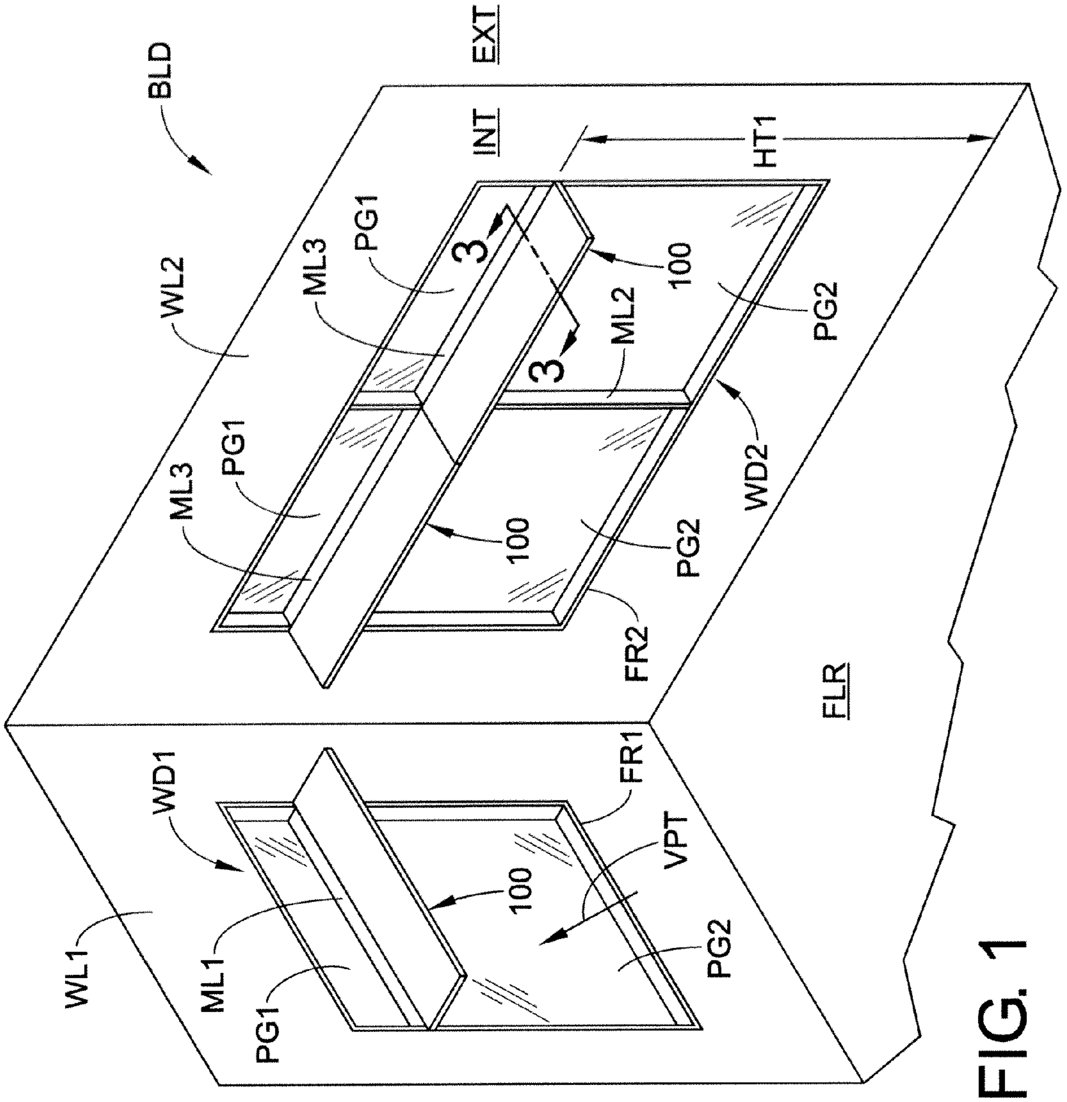
FIG. 1 is a perspective view of an associated building structure having associated windows with examples of reflective light shelf systems in accordance with the subject matter of the present disclosure installed therealong within the associated building structure.
Figure 2:
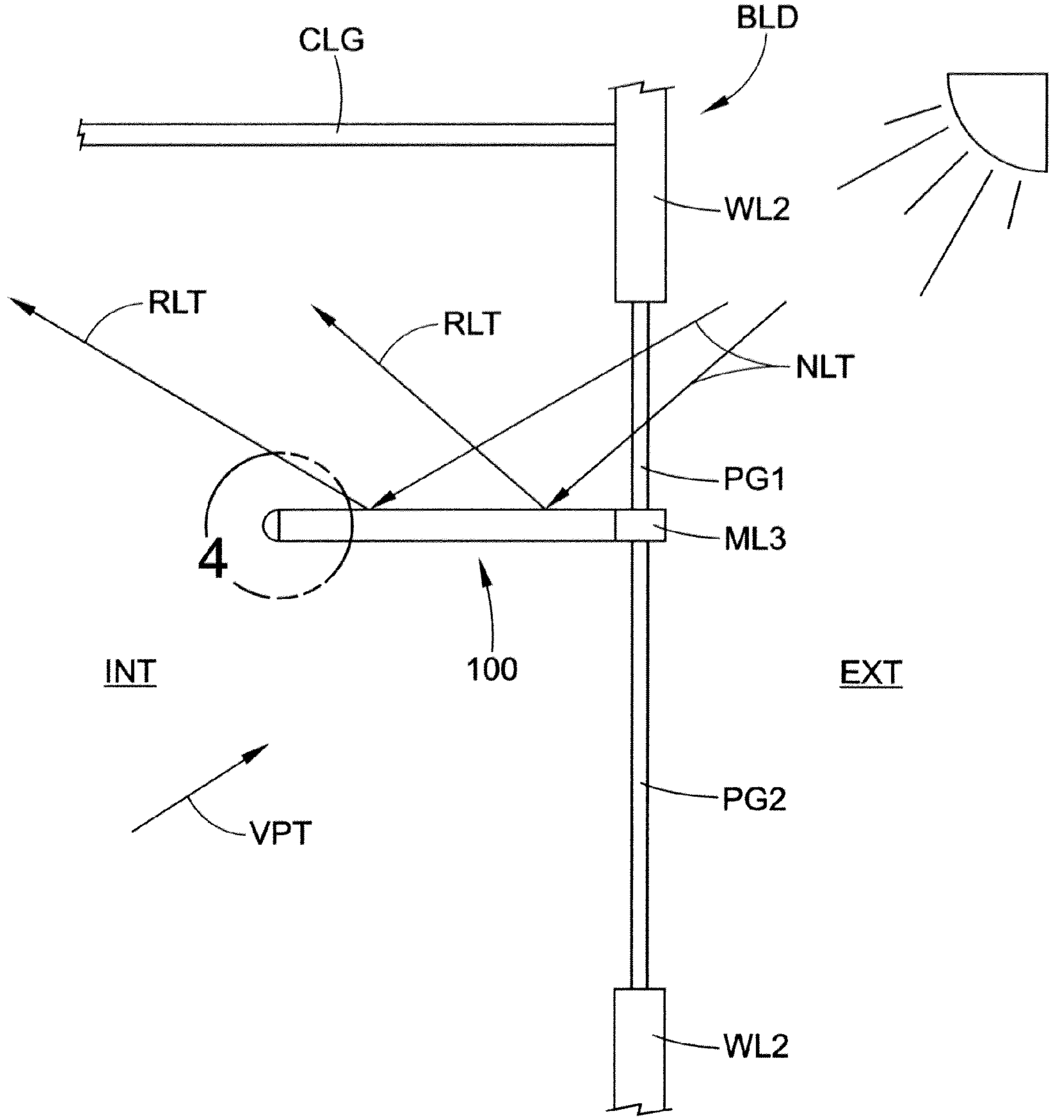
FIG. 2 is a side elevation view of one of the reflective light shelf systems installed along an associated window of the associated building structure in FIG. 1.

Turning now to the drawings, wherein the showings are for the purpose of illustrating examples of the subject matter of the present disclosure and which are not intended to be limiting, FIGS. 1 and 2 illustrate a portion of a conventional building structure BLD which can be of any suitable type, kind and/or construction. The building structure includes a first wall WL1 and a second wall WL2. A first window WD1 is shown installed in the first wall and a second window WD2 is shown installed in the second wall. First window WD1 includes a first frame FR1 with a first or upper pane of glass PG1 and a second or lower pane of glass PG2 supported therein. An optional window mullion ML1 is shown as extending in a generally horizontal direction between the first and second panes of glass and is connected at the opposing ends thereof (not numbered) to first frame FR1.

Similarly, second window WD2 includes a second frame FR2 and a plurality of panes of glass supported therein. Second window WD2 differs from first window WD1 in that a window mullion ML2 extends in a generally vertical direction within second frame FR2 to separate second window WD2 into two sections. Each of the two sections is shown as including a first or upper pane of glass PG1 and a second or lower pane of glass PG2 with an optional window mullion ML3 disposed between the first and second panes of glass. Window mullions ML3, if provided, can extend in a generally horizontal direction and can be connected at the opposing ends thereof (not numbered) to second frame FR2 and window mullion ML2.

Additionally, building structure BLD includes an interior space INT that includes a floor FLR or other bottom wall and a ceiling CLG or other top wall. The space external to the building structure (i.e., the surroundings outside of the building structure) is generally identified throughout the drawings by reference characters EXT.

FIGS. 1 and 2 also illustrate a plurality of reflective light shelf systems 100 in accordance with the subject matter of the present disclosure that are supported on or along windows WD1 and WD2 of building structure BLD. Reflective light shelf systems 100 are shown as being supported adjacent a window (e.g., first window WD1 and second window WD2) and include a reflective surface that is adapted to direct light from the exterior of the building into the interior space of the building structure, such as to increase passive lighting within the interior space of the building structure, for example. As an example, natural light (e.g., direct or indirect sunlight) is commonly used to increase passive lighting within a building structure. As is illustrated in FIG. 2, natural light, which is represented by arrows NLT, streams through upper pane of glass PG1 toward reflective light shelf system 100. Through the use of a reflective light shelf, such as reflective light shelf system 100, for example, the natural light is reflected off of the reflective thereof and into interior space INT of the building structure. As is represented by arrows RLT in FIG. 2, the natural light is redirected upwardly toward ceiling CLG. In this manner, the passive illumination within the interior space of the building structure can be increased.

A reflective light shelf in accordance with the subject matter of the present disclosure will preferably include at least one surface having sufficient reflectivity to reflect and/or redirect light from an exterior light source, such as natural light arrows NLT, for example, into an interior space of a building structure, such as is indicated by reflected light arrows RLT, for example. It will be appreciated that the at least one reflective surface can have any suitable surface finish and/or be of any suitable color for providing the aforementioned level of reflectivity. As one example, one or more metallic colors (e.g., silver, gold or copper) could be applied to the surface or could be an exposed surface of the material (e.g., steel, aluminum or copper) from which the reflective light shelf is formed. As another example, one or more non-metallic colors (e.g., white) could be applied to the surface, such as in the form of a paint layer, an epoxy coating or a polymeric film, for example. Additionally, as will be discussed in greater detail hereinafter, a higher gloss finish is generally preferred over a lower gloss finish. In the case of a paint or epoxy covering, a high gloss finish would be preferred instead a semi-gloss finish, and a semi-gloss finish would be preferable instead of a satin or matte finish.

As indicated above, in a preferred arrangement, at least one of the surfaces of the reflective light shelf can have a smooth, high gloss or otherwise shiny surface that is capable of generating a reflection that is more spectral than diffuse in nature. And, such a smooth, high gloss or otherwise shiny surface can be provided in any suitable manner, such as through the use of: mechanical finishing techniques (e.g., polishing, burnishing and/or buffing); chemical cleaning, chemical polishing and/or other chemical treatments; coating and/or layering of materials (e.g., anodized or oxide coating, paint, epoxy and/or polymeric film) on or along the surface; or any combination of the foregoing and/or other surface finishing techniques.

Generally, one or more of the surfaces of the reflective light shelf will be finished in a manner such that a combination of diffuse and specular reflections are generated thereby. In a preferred arrangement, at least one of the surfaces of the reflective light shelf will exhibit a combination of diffuse and specular reflections in which the proportion of specular reflection (e.g., direct reflection, mirror-like reflection, reflection in a definite direction) is equal to or greater than the corresponding proportion of diffuse reflection (e.g., scattered reflection, reflection in many or all directions). That is, in a preferred embodiment, at least one surface of the reflective light shelf will be sufficiently smooth, glossy, polished or otherwise shiny that the amount of specular reflection that is generated by an external light source illuminating the surface will be equal to or greater than the amount of diffuse reflection that is generated by the at least one surface.

Figure 3:
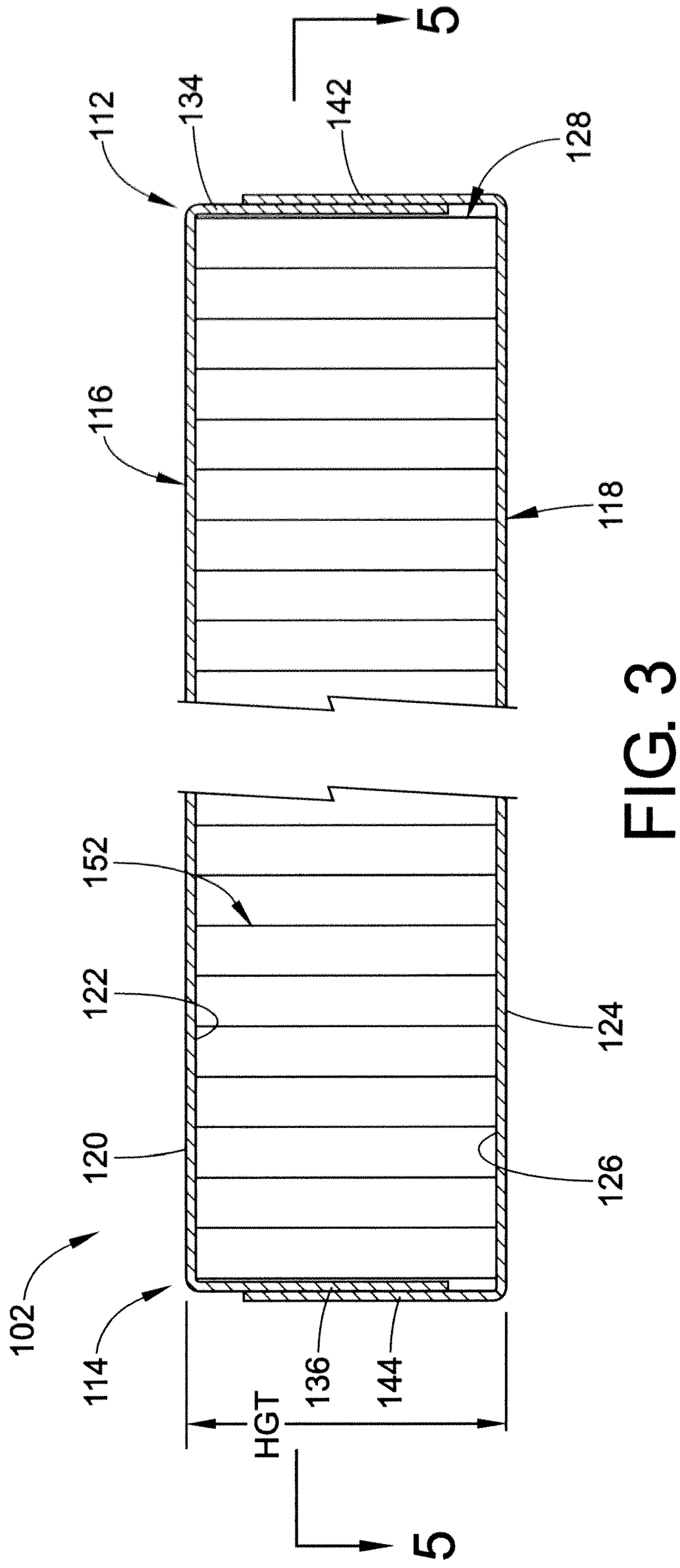
FIG. 3 is a cross-sectional side view of a reflective light shelf in accordance with the subject matter of the present disclosure taken from along line 3-3 of the reflective light shelf system in FIG. 1.
Figure 4:
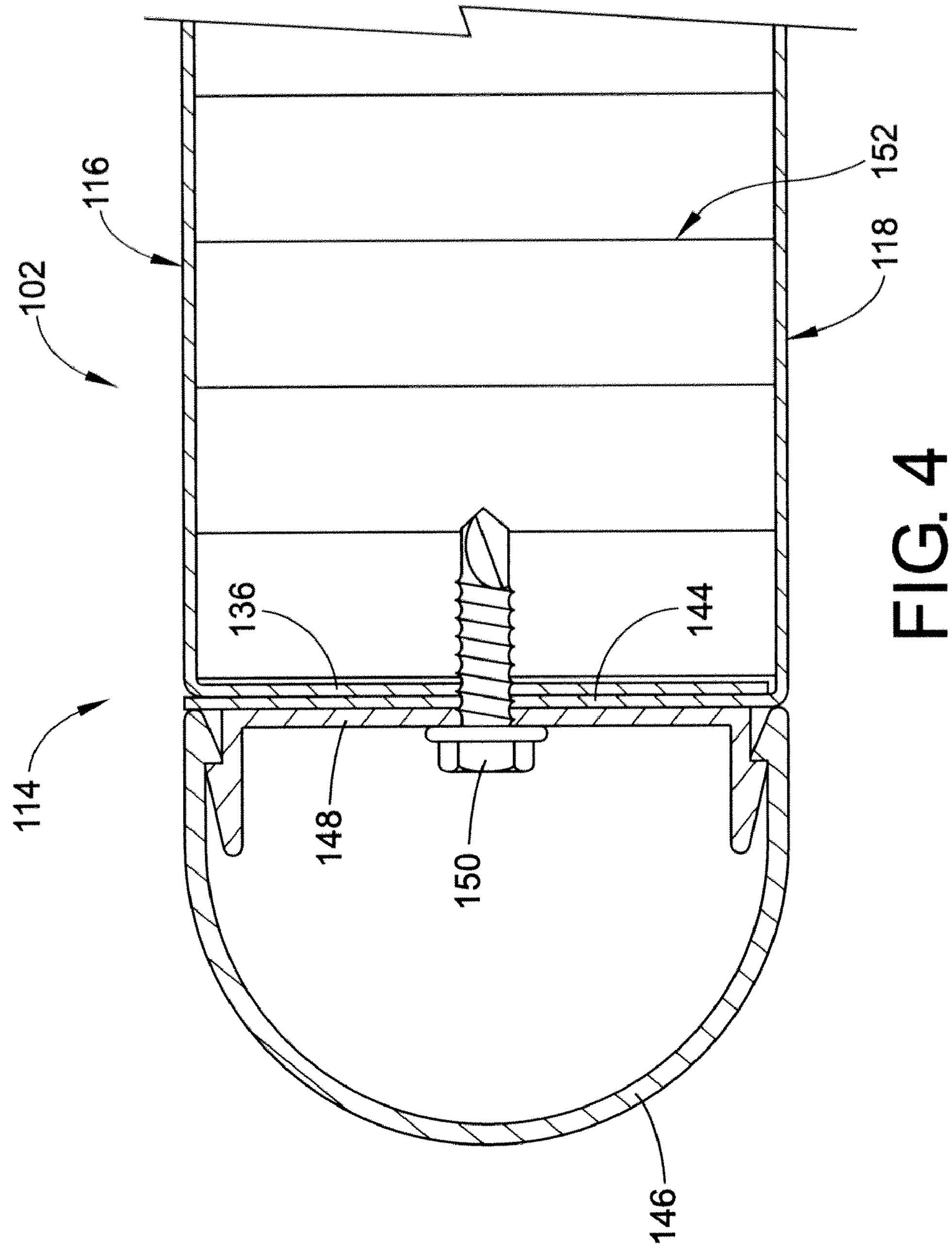
FIG. 4 is a cross-sectional side view of an enlarged portion of the reflective light shelf in FIGS. 1-3 identified as Detail 4 of the reflective light shelf system in FIG. 2.
Figure 5:
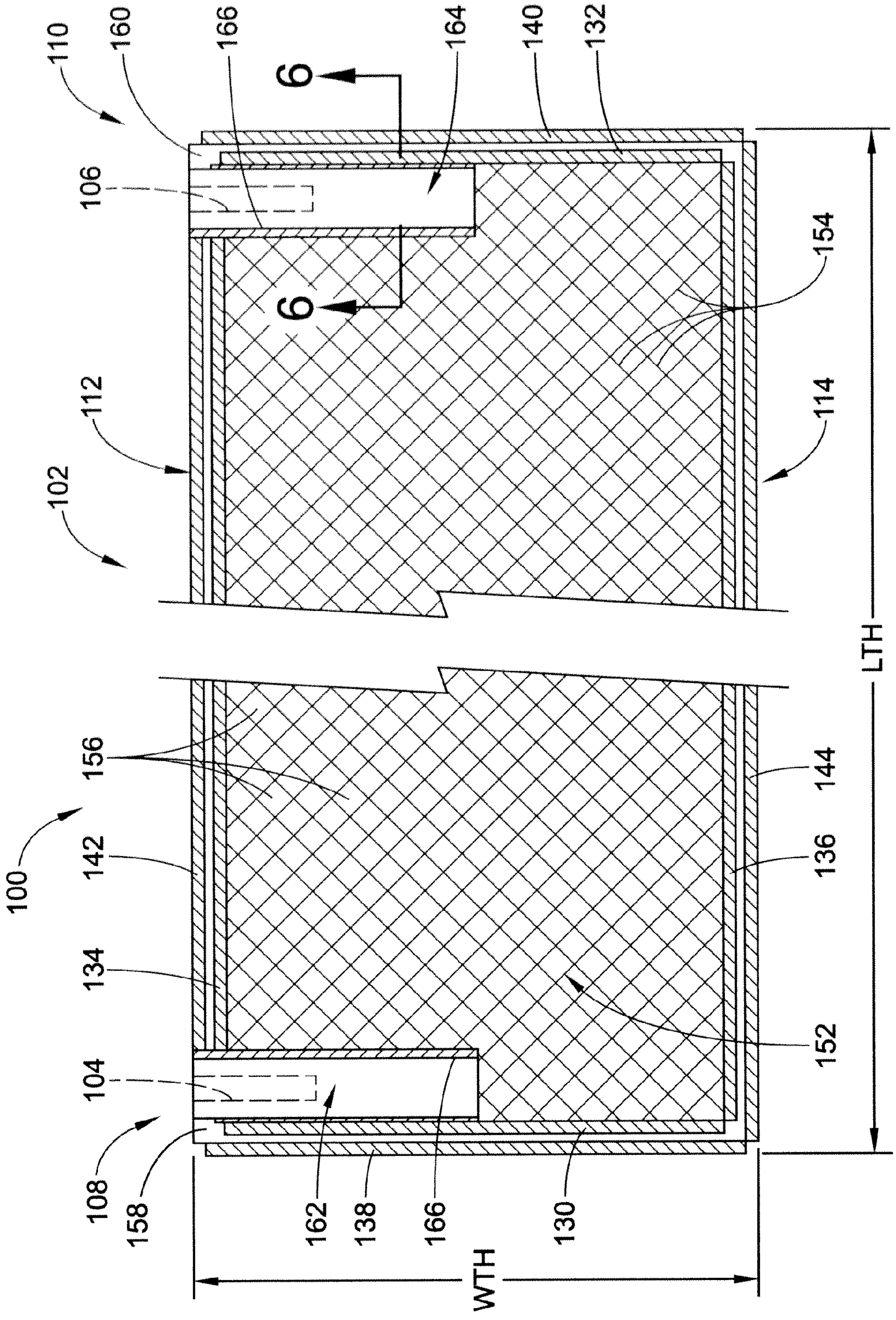
FIG. 5 is a cross-sectional top view of the reflective light shelf shown in FIGS. 3 and 4 taken from along line 5-5 in FIG. 3.
Figure 6:
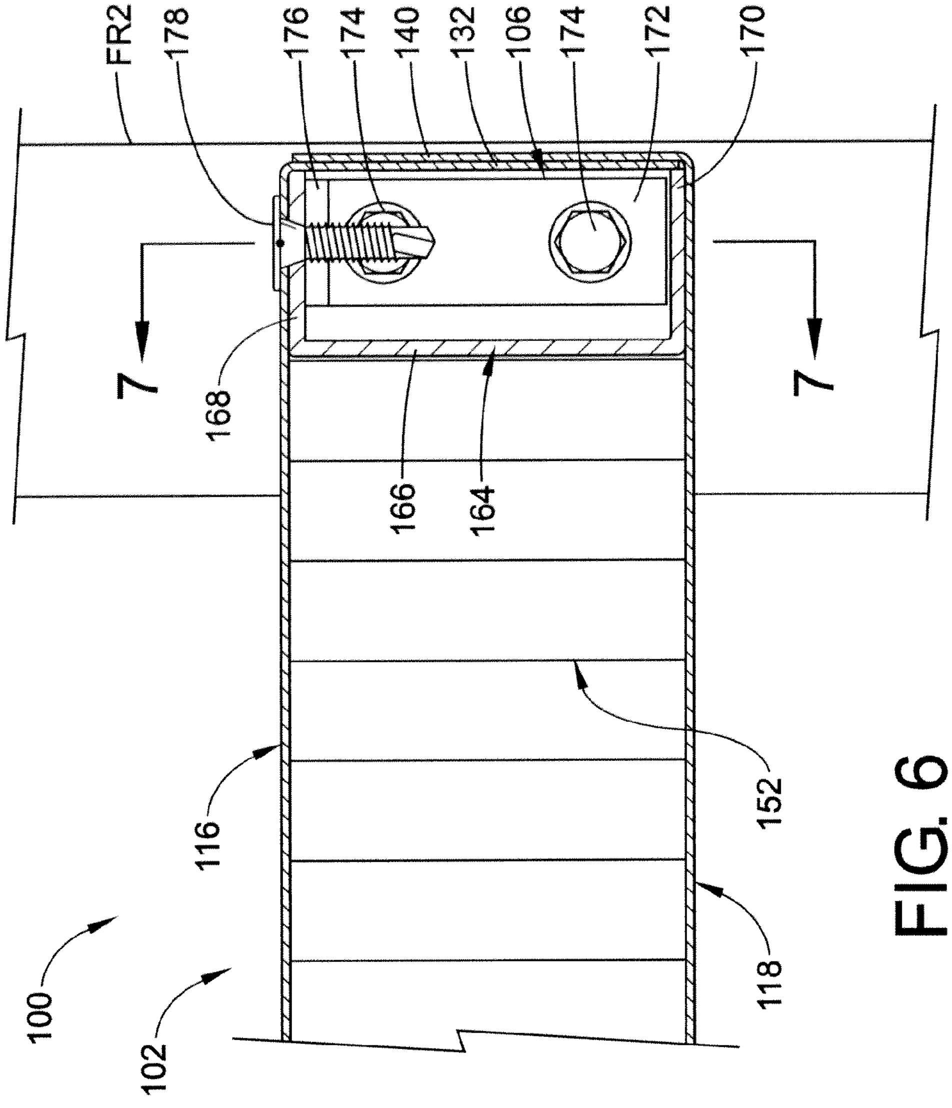
FIG. 6 is a cross-sectional side view of one example of the reflective light shelf system in FIGS. 1 and 2 illustrating a portion of the reflective light shelf in FIGS. 3-5 taken from along line 6-6 in FIG. 5 and a mounting bracket securing the reflective light shelf to the associated building structure.

One example of a suitable construction for reflective light shelf system 100 is shown in greater detail in FIGS. 3-7. Turning, first, to FIGS. 5 and 6, reflective light shelf system 100 includes a reflective light shelf 102 and at least one mounting bracket adapted to secure the reflective light shelf to a suitable structure or feature of the window or wall of the building structure. In the present exemplary arrangement, first and second mounting brackets 104 and 106 are shown and described herein as being secured on or along a window frame (e.g., one of frames FR1 and FR2) or one of the window mullions (e.g., one of mullions ML1, ML2 and ML3). It will be appreciated, however, that any other suitable component or feature of the building structure could alternately be used.

With reference, now, to FIG. 5, reflective light shelf 102 extends longitudinally between a first end 108 and a second end 110 to thereby define a nominal length of the reflective light shelf, which nominal length is represented by reference dimension LTH. Reflective light shelf 102 also includes first and second longitudinally-extending edges 112 and 114 that are spaced laterally from one another to thereby define a nominal width of the reflective light shelf, which nominal width is represented by reference dimension WTH. It will be appreciated that reflective light shelf 102 can be of any suitable length and/or width, such as a length within a range of from approximately 3 feet to approximately 15 feet, for example, and a width within a range from approximately 1 foot to approximately 4 feet, for example.

In the exemplary arrangement shown, reflective light shelf 102 includes a first or upper wall 116 and a second or lower wall 118 that is spaced from the first wall to thereby define a nominal height of the reflective light shelf, which nominal height is represented in FIG. 3 by reference dimension HOT. First wall 116 includes an outer surface 120 and an opposing inner surface 122. Similarly, second wall 118 includes an outer surface 124 and an opposing inner surface 126. The first and second walls are oriented relative to one another such that inner surfaces 122 and 126 are facing one another. Additionally, the first and second walls are positioned in spaced relation to one another such that a shelf cavity or space 128 is at least partially defined therebetween.

In the exemplary embodiment shown in FIGS. 3-7, first wall 116 also includes optional first and second end wall portions 130 and 132 and optional first and second side wall portions 134 and 136. The end wall portions and/or side wall portions, if provided, can project in a generally heightwise direction from the first wall, such as in a direction away from outer surface 120 and toward inner surface 122, for example. Similarly, second wall 118 can optionally include first and second end wall portions 138 and 140 and/or first and second side wall portions 142 and 144. These end wall portions and/or side wall portions, if provided, can also project in a generally heightwise direction from the second wall, such as in a direction away from outer surface 124 and toward inner surface 126, for example.

It will be appreciated that any such end wall portions and/or side wall portions, if included, will act to further define shelf cavity 128 and can also operate as structural features for mounting additional elements and/or components that may be included on or along reflective light shelf 102. As one example, reflective light shelf assembly can, optionally, include a cover wall 146, such as may be included to improve the cosmetic appearance of reflective light shelf 102 or for other purposes. It will be appreciated that cover wall 146 can be secured on or otherwise attached to reflective light shelf 102 in any suitable manner. For example, a plurality of mounting clips 148 can be positioned in spaced relation to one another along one or more of the ends (e.g., ends 108 and 110) and/or edges (e.g., edges 112 and 114) of the reflective light shelf. As shown in FIG. 4, mounting clip is disposed along side wall portions 136 and 144 of first and second walls 116 and 118, respectively, and can be secured thereto in any suitable manner, such as by using a fastener 150 threadably secured to side wall portions 136 and 144, for example. Additionally, it will be appreciated that a cover wall, such as cover wall 146, for example, if provided, can be of any suitable shape, size and/or configuration and that the cover wall shown and described herein is merely exemplary.

Reflective light shelf 102 also includes an inner-core structure disposed within at least a portion of shelf cavity 128. The inner-core structure extends in a generally heightwise direction between first wall 116 and second wall 118 and can be in abutting engagement with either or both of the first and second walls. In a preferred arrangement, the inner-core structure is secured on or along at least one of first and second walls 116 and 118 such that a composite beam-like structure is formed thereby. It will be appreciated that the inner-core structure can be of any suitable type, kind, configuration and/or construction. Additionally, it will be appreciated that the inner-core structure can be formed from any suitable material or combination of materials. As one example, the inner-core structure could be at least partially formed from a metal material (e.g., an aluminum alloy honeycomb) that is laminated, adhered, or otherwise attached to at least one of the first and second walls. As another example, the inner-core structure could be at least partially formed from a polymeric material (e.g., a rigid thermoplastic honeycomb or a rigid thermoset foam) that is laminated, adhered or otherwise attached to at least one of the first and second walls. As yet another example, the inner-core structure could be at least partially formed from a composite of fibrous material coated with a polymeric material (e.g., a phenolic resin impregnated paper honeycomb) that is laminated, adhered or otherwise attached to at least one of the first and second walls.

In FIGS. 3-7, the inner-core structure discussed above is generally represented by item number 152 and is shown in FIG. 5 as being of a honeycomb configuration with a plurality of inner-core elements 154 that at least partially define a plurality of cavities or cells 156. It will be appreciated that the inner-core elements and the corresponding cells that are at least partially defined thereby can be of any suitable size, shape, thickness, alignment, configuration and/or arrangement. Additionally, it will be appreciated that such characteristics are expected to vary from application-to-application as well as in relation to the materials and/or construction of the inner-core structure, such as has been discussed above, for example. Furthermore, it will be appreciated that first and second walls 116 and 118 can be formed from any suitable material or combination of materials, such as an aluminum or steel alloy, for example, and that such material choice may also influence the materials, construction and/or other characteristics of the inner-core structure, such as has been discussed above.

Returning briefly to FIGS. 1 and 2, it will be appreciated that reflective light shelf assemblies in accordance with the subject matter of the present disclosure, such as reflective light shelf assembly 100, for example, as well as conventional reflective light shelf constructions are preferably installed at a height from floor FLR that would be suitable for reflecting and/or redirecting light toward ceiling CLG of the building structure. In many cases, the installed height, which is represented in FIG. 1 by reference dimension HT1, will be above eye-level form most, if not all, of the occupants of the interior space. As such, it is anticipated that reflective light shelf assembly 100 will typically be viewed from below, as is indicated in FIGS. 1 and 2 by viewpoint arrow VPT. Accordingly, it is believed desirable for any fasteners or other mounting components that are expected to remain visible after installation to be visible from above the reflective light shelf assembly rather than from below the assembly.

Returning, now, to FIG. 5, side wall portions 134 and 142 extend longitudinally along first edge 112 between first and second ends 108 and 110. However, side wall portions 134 and 142 respectively terminate prior to reaching end wall portions 130 and 138 at first end 108 and end wall portions 132 and 140 at second end 110 such that openings 158 and 160 are formed along the first edge and provide access to shelf cavity 128. In a preferred arrangement, openings 158 and 160 are preferably of suitable dimension to respectively receive first and second mounting brackets 104 and 106 within the shelf cavity. In this manner, reflective light shelf 102 can be capable of concealing substantially all or mounting brackets 104 and 106, such as may be desirable for improving the aesthetic appearance of the reflective light shelf assembly, for example.

Figure 7:
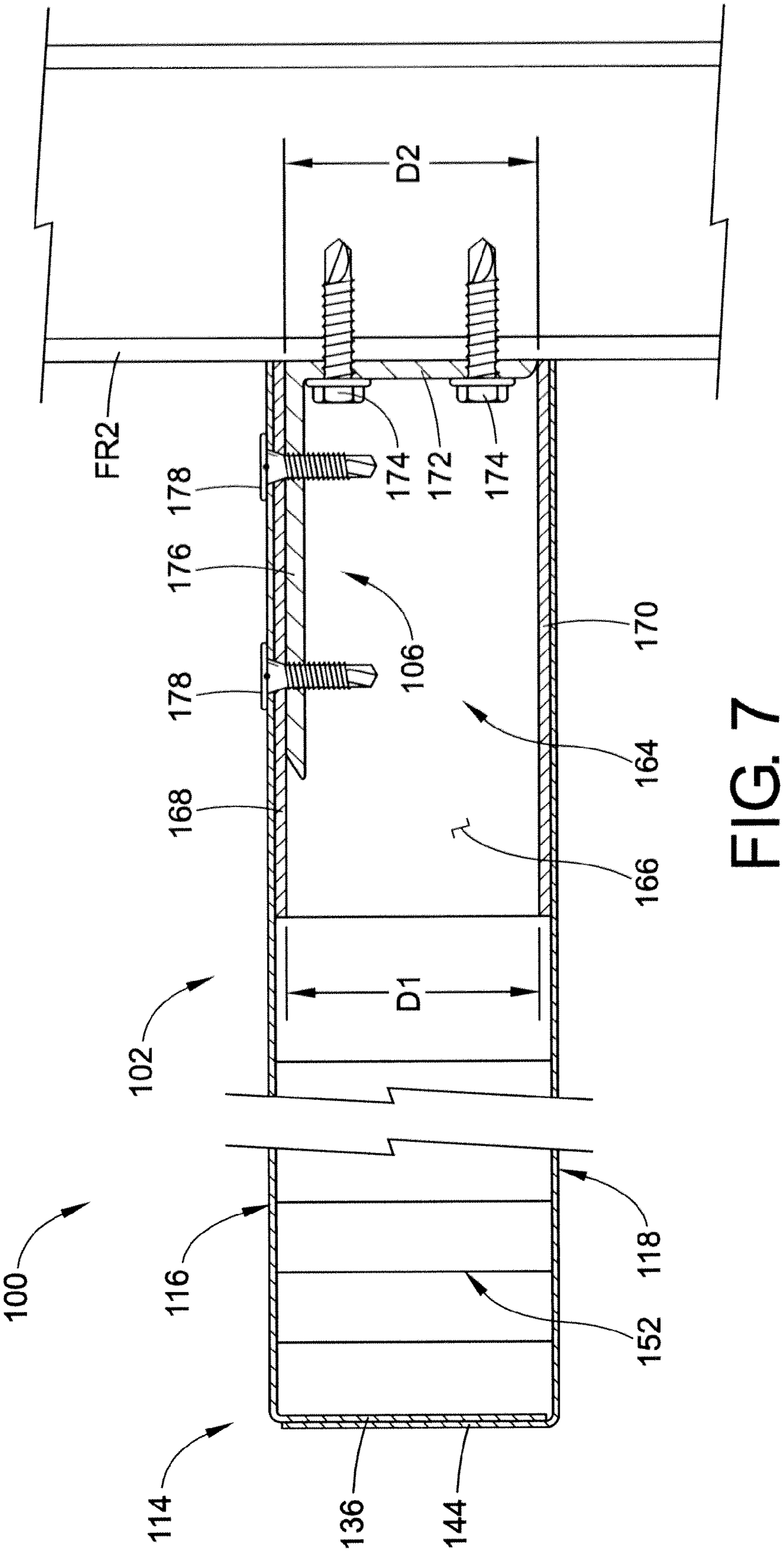
FIG. 7 is a cross-sectional end view of the reflective light shelf system in FIGS. 1, 2 and 6 illustrating a portion of the reflective light shelf shown in FIGS. 3-5 taken from along line 7-7 in FIG. 6 and a mounting bracket securing the reflective light shelf to the associated building structure.

Optionally, a reflective light shelf in accordance with the subject matter of the present disclosure can include one or more support elements received within the reflective light shelf that act to buttress the reflective light shelf in an installed condition. It will be appreciated that such one or more support elements can be of any suitable type, kind, configuration and/or construction. For example, reflective light shelf 102 is shown in FIG. 5-7 as including a first support element 162 disposed within shelf cavity 128 along first end 108 of the reflective light shelf and a second support element 164 disposed within shelf cavity 128 along second end 110 of the reflective light shelf. First and second support elements 162 and 164 are shown as being substantially similar to one another and including a first element wall 166 that extends heightwise between first and second walls 116 and 118. The first and second support elements also include a second element wall 168 that projects longitudinally from the first element wall and is disposed adjacent first wall 116. The first and second support elements further include a third element wall 170 that also project longitudinally from the first element wall but in spaced relation to the second element wall adjacent second wall 118. As shown in FIG. 7, third element wall 170 is spaced a distance from second element wall 168, as is represented by dimension D1. The first and second support elements can be secured on or along one of more of first and second walls 116 and 118 in any suitable manner. In a preferred arrangement, the first and second support elements are secured to at least one of the first and second walls using a connection or joint that is not visible from along the exterior of the reflective light shelf, such as, for example, by using a flowed-material joint (e.g., a weld, a brazed joint, a soldered joint or an adhesive connection).

Mounting brackets 104 and 106 can be of any suitable type, kind, configuration and/or construction that is suitable for securement on or along an associated window, wall or other building structure. In the exemplary arrangement shown, mounting brackets 104 and 106 are substantially similar to one another and include a first bracket wall portion 172 that is suitable for abuttingly engaging an associated window, wall or other building structure, such as window frame FR2 as shown in FIGS. 6 and 7, for example. It will be appreciated that mounting brackets 104 and 106 can be secured or otherwise attached on or along the associated window, wall or other building structure in any suitable manner, such as by using one or more fasteners 174 that extend through a suitable opening (not numbered) in the mounting brackets to connectably engage window frame FR2, for example.

Mounting brackets 104 and 106 are also shown as including a second bracket wall portion 176 that projects in a generally widthwise direction from first bracket wall portion 172 and is adapted abuttingly engage reflective light shelf 102 to support the same on the associated window, wall or other building structure. Reflective light shelf 102 can be secured on or along mounting brackets 104 and 106 in any suitable manner. For example, one or more fasteners 178 can be used that extend through at least a portion of the reflective light shelf, preferably from along first wall 116 thereof, and connectably engage second bracket wall portion 176.

In a preferred embodiment, first and second support elements 162 and 164 are provided within shelf cavity 128, such as has been previously described. In such case, first bracket wall portion 172 preferably extends a distance along the associated window, wall or other building structure, as is represented by reference dimension D2 in FIG. 7, that is less than the distance D1 between second and third element walls 168 and 170 of the first and second support elements. In this manner, mounting brackets 104 and 106 can be substantially entirely received within reflective light shelf 102 to thereby substantially conceal the mounting brackets. Additionally, fasteners 178 are installed from along first wall 116 such that the exposed portions thereof (e.g., the heads of the fasteners) are not visible from below reflective light shelf assembly 100.

As used herein with reference to certain elements, components and/or structures (e.g., "first end" and "second end"), numerical ordinals merely denote different singles of a plurality and do not imply any order or sequence unless specifically defined by the claim language.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject matter of the present disclosure. Obviously, modifications and alterations will occur to others upon reading and understanding the preceding detailed description. Accordingly, it is to be distinctly understood that the foregoing descriptive matter is to be interpreted merely as illustrative and not as a limitation. As such, it is intended that the subject matter of the present disclosure be construed as including all such modifications and alterations insofar as they come within the scope of the appended claims and any equivalents thereof.

The invention claimed is:

1. A reflective light shelf adapted for use within an associated building structure adjacent an associated window thereof, said reflective light shelf comprising:

a first wall extending longitudinally between opposing first and second ends that at least partially define a shelf length and extending laterally between opposing first and second edges that at least partially define a shelf width, said first wall including an inner surface and an outer surface disposed opposite said inner surface with said outer surface exhibiting a combination of diffuse and spectral reflectivity operative to reflect light received through the associated window into the associated building structure;

a second wall extending longitudinally between opposing first and second ends that at least partially define said shelf length and extending laterally between opposing first and second edges that at least partially define said shelf width, said second wall including an inner surface and an outer surface disposed opposite said inner surface, said second wall oriented with respect to said first wall such that said inner surfaces of said first and second walls are facing one another with said first ends disposed adjacent one another forming a first shelf end and said second ends disposed adjacent one another forming a second shelf end, said first and second walls being positioned in spaced relation to one another such that a shelf height is at least partially defined therebetween and such that a shelf chamber is at least partially formed between said inner surfaces of said first and second walls;

a first support element received within said shelf chamber and including a first wall portion extending in a heightwise direction between said first and second walls, said first support element oriented in a widthwise direction relative to said first and second walls, and said first support element being disposed along said first shelf end such that a first cavity is formed between said first and second walls along said first shelf end outwardly of said first support element in a lengthwise direction; and, a second support element received within said shelf chamber and including a first wall portion extending in a heightwise direction between said first and second walls, said second support element oriented in a widthwise direction relative to said first and second walls, and said second support element being disposed along said second shelf end such that a second cavity is formed between said first and second walls along said second shelf end outwardly of said second support element in a lengthwise direction; and, an inner-core structure disposed within said shelf chamber between said inner surfaces of said first and second walls, said inner-core structure terminating adjacent at least a portion of said first and second support elements such that said first and second cavities remain at least partially void of said inner-core structure.

2. A reflective light shelf according to claim 1, wherein said first wall includes a first side wall disposed along said first edge and a second side wall disposed along said second edge, said first and second side walls projecting from said first wall in a heightwise direction extending away from said outer surface and toward said inner surface of said second wall.

3. A reflective light shelf according to claim 2, wherein said first side wall extends lengthwise along said first wall and terminates prior to first and second shelf ends thereby forming first and second openings in respective communication with first and second cavities.

4. A reflective light shelf according to claim 2, wherein said second wall includes a first side wall disposed along said first edge and a second side wall disposed along said second edge, said first and second side walls projecting from said second wall in a heightwise direction extending away from said outer surface and toward said inner surface of said first wall.

5. A reflective light shelf according to claim 4, wherein said first side wall of said first wall and said first side wall of said second wall each extend lengthwise therealong and terminate prior to first and second shelf ends thereby forming first and second openings in respective communication with first and second cavities.

6. A reflective light shelf according to claim 1, wherein said first wall includes opposing first and second end walls disposed respectively along said first and second ends of said first wall, said first and second end walls projecting from said first wall in a heightwise direction extending away from said outer surface and toward said inner surface of said second wall.

7. A reflective light shelf according to claim 6, wherein said first and second end walls are respectively disposed outwardly in a lengthwise direction of said first and second support elements and respectively further define first and second cavities.

8. A reflective light shelf according to claim 1, wherein said first and second support elements are fixedly connected to at least one of said first and second walls by way of a flowed-material joint that is that is not visible along at least said outer surface of said second wall.

9. A reflective light shelf according to claim 1, wherein said first and second support elements each include a second wall portion disposed along said inner surface of said first wall and a third wall portion disposed along said inner surface of said second wall, said second and third wall portions projecting from said first wall portion in a lengthwise direction.

10. A reflective light shelf according to claim 9, wherein said shelf chamber has a chamber height, and said second and third wall portions project from said first wall portion outwardly in a lengthwise direction and into said first and second cavities, said second and third wall portions each including an exposed surface opposite a corresponding one of said first and second walls with said exposed surfaces defining a cavity height of said first and second cavities that is less than said chamber height.

11. A reflective light shelf according to claim 9, wherein said first wall includes a first passage and a second passage, said first passage disposed along said first end and extending through said first wall and said second wall portion of said first support element into communication with said first cavity, and said second passage disposed along said second end and extending through said first wall and said second wall portion of said second support element into communication with said second cavity.

12. A reflective light shelf according to claim 1, wherein said spectral reflectivity of said outer surface of said first wall is equal to or greater than said diffuse reflectivity of said outer surface of said first wall.

13. A reflective light shelf according to claim 12, wherein at least said outer surface of said first wall includes a coating of material providing a high-gloss finish on said outer surface.

14. A reflective light shelf according to claim 1, wherein said inner-core structure includes one of a metallic honeycomb, a polymeric honeycomb, a polymeric foam and a fibrous honeycomb coated with polymeric material.

15. A reflective light shelf system adapted to be supported adjacent an associated window of an associated building structure, said reflective light shelf system comprising:

a reflective light shelf extending lengthwise between opposing first and second ends and extending widthwise between opposing first and second edges, said reflective light shelf including:

a first wall including an outer surface exhibiting a combination of diffuse and spectral reflectivity adapted to reflect light into the associated building structure and an inner surface disposed opposite said outer surface;

a second wall including an inner surface disposed in facing relation to said inner surface of said first wall and an outer surface opposite said inner surface, said second wall disposed in spaced relation to said first wall such that a shelf height is defined between said outer surfaces of said first and second walls;

an inner-core structure operatively connected between said inner surfaces of said first and second walls;

a first cavity formed along said first end and extending widthwise into said reflective light shelf from along said first edge; and, a second cavity formed along said second end and extending widthwise into said reflective light shelf from along said first edge;

a first mounting bracket including a first portion adapted for securement along the associated window and a second portion extending from said first portion in approximately transverse relation thereto; and, a second mounting bracket including a first portion adapted for securement along the associated window and a second portion extending from said first portion in approximately transverse relation thereto;

said first and second mounting brackets being adapted to be respectively received within said first and second cavities of said reflective light shelf such that said first and second mounting brackets are visually concealed when said reflective light shelf system is installed on the associated window.

16. A reflective light shelf system according to claim 15, wherein said reflective light shelf includes first and second support elements disposed between said first and second walls, said first and second support elements each including a first wall portion extending in a heightwise direction and positioned relative to said first and second ends of said reflective light shelf that said first support element at least partially defines said first cavity and said second support element at least partially defines said second cavity.

17. A reflective light shelf system according to claim 16, wherein said first and second support elements are fixedly connected to at least one of said first and second walls by way of a flowed-material joint that is that is not visible along at least said outer surface of said second wall.

18. A reflective light shelf system according to claim 16, wherein said first and second support elements each include a second wall portion disposed along said inner surface of said first wall and a third wall portion disposed along said inner surface of said second wall, said second and third wall portions projecting from said first wall portion in a lengthwise direction.

19. A reflective light shelf system according to claim 15, said first and second mounting brackets have a bracket height, and said second and third wall portions of said first and second support elements project outwardly from said first wall portion thereof in a lengthwise direction and into said first and second cavities, said second and third wall portions each including an exposed surface opposite a corresponding one of said first and second walls with said exposed surfaces defining a cavity height of said first and second cavities that is greater than said bracket height of said first and second mounting brackets.

20. A method of installing a reflective light shelf system, said method comprising:

a) providing a reflective light shelf extending lengthwise between opposing first and second ends and extending widthwise between opposing first and second edges, said reflective light shelf including:
   a first wall including an outer surface exhibiting a combination of diffuse and spectral reflectivity adapted to reflect light into the associated building structure and an inner surface disposed opposite said outer surface;
   a second wall including an inner surface disposed in facing relation to said inner surface of said first wall and an outer surface opposite said inner surface, said second wall disposed in spaced relation to said first wall such that a shelf height is defined between said outer surfaces of said first and second walls;
   an inner-core structure operatively connected between said inner surfaces of said first and second walls;
   a first cavity formed along said first end and extending widthwise into said reflective light shelf from along said first edge; and,
   a second cavity formed along said second end and extending widthwise into said reflective light shelf from along said first edge;

b) providing first and second mounting brackets that each include a first portion adapted for securement along an associated window of an associated building structure and a second portion extending from said first portion in approximately transverse relation thereto;

c) securing said first and second mounting brackets on the associated building structure along the associated window thereof; and, d) supporting said reflective light shelf on said first and second mounting brackets such that said first and second mounting brackets are received within respective ones of said first and second cavities and visibly concealed thereby.

21. A method according to claim 20 further comprising securing said reflective light shelf on said first and second mounting brackets using one or more securement devices installed along said outer surface of said first wall such that said securement devices are visibly concealed from below said reflective light shelf.

* * * * *

UNITED STATES PATENT AND TRADEMARK OFFICE

CERTIFICATE OF CORRECTION

PATENT NO. : 8,116,004 B2
APPLICATION NO. : 12/750995
DATED : February 14, 2012
INVENTOR(S) : Robert T. Griffiths It is certified that error appears in the above-identified patent and that said Letters Patent is hereby corrected as shown below:

In column 11, line 45, delete the second instance of “that is”.

Signed and Sealed this
Twenty-ninth Day of May, 2012

David J. Kappos
*Director of the United States Patent and Trademark Office*